United States Patent [19]

Kuze et al.

[11] Patent Number: 5,104,964
[45] Date of Patent: Apr. 14, 1992

[54] BRANCHED POLYCARBONATE HAVING BRANCHING PARAMETER AND DEGREE OF BRANCHING

[75] Inventors: Shigeki Kuze; Hideo Kusuyama; Masayuki Shinohara; Masaya Okamoto, all of Ichihara, Japan

[73] Assignee: Idemitsu Petrochemical Co., Ltd., Tokyo, Japan

[21] Appl. No.: 549,270

[22] Filed: Jul. 6, 1990

[30] Foreign Application Priority Data

| Aug. 3, 1989 | [JP] | Japan | 1-200407 |
| Aug. 3, 1989 | [JP] | Japan | 1-200408 |
| Dec. 13, 1989 | [JP] | Japan | 1-321552 |

[51] Int. Cl.$^5$ ............................................. C08G 64/04
[52] U.S. Cl. .................................... 528/204; 528/125; 528/171; 528/174; 528/196; 528/202
[58] Field of Search ............... 528/204, 196, 202, 125, 528/171, 174

[56] References Cited

U.S. PATENT DOCUMENTS 4,695,620  9/1987  Masumoto et al. ................ 528/196
4,888,400  12/1989  Boden et al. ....................... 525/462

Primary Examiner—Harold D. Anderson
Attorney, Agent, or Firm—Frishauf, Holtz, Goodman & Woodward

[57] ABSTRACT

A branched polycarbonate having (1) an intrinsic viscosity of 0.3 to 2 dl/g, (2) a branching parameter of 0.05 to 0.9, (3) a degree of branching of $0.2 \times 10^{-4}$ and optionally (4) a taking-off parameter of 2.5 to 20. The branched polycarbonate is useful as a raw material for blow-moldings.

13 Claims, No Drawings

BRANCHED POLYCARBONATE HAVING BRANCHING PARAMETER AND DEGREE OF BRANCHING

BACKGROUND OF THE INVENTION

1. Field of the Invention

The present invention relates to branched polycarbonates and a process for production thereof, and more particularly to novel branched polycarbonates having properties suitable for blow molding to produce large sized blow molded articles with less heterogeneity of thickness and to an efficient process for production thereof.

2. Description of the related arts

It has been difficult to produce blow moldings from known polycarbonates since they behave as Newtonian fluid in their molten state. For dissolution of this problems, some processes have been proposed in Japanese Patent Publication Nos. 17149/1969, 23918/1972, 11733/1985 and the like wherein the coexistence of a polyfunctional organic compound containing three or more functional groups such as phloroglucine, trimellitic acid, 1-($\alpha$-methyl-$\alpha$-(4'-hydroxyphenyl)ethyl)-4-($\alpha'$,$\alpha'$-bis(4''-hydroxyphenyl)ethyl) benzene as a branching agent imparts a branching property to said polycarbonates. The thermoplastic branched polycarbonate obtained by their processes presents non-Newtonina fluid properties in the molten state, and its blow moldability can be improved to some extent. However, the subsequent investigations showed that thus obtained branched polycarbonates are not practical for production of large sized blow molding because of their insufficient melt resistance. Accordingly, an attempt for improvement is disclosed in Japanese Patent Application Laid-Open No. 146920/1987.

However, when melt resistance (melt tension) sufficient to produce large sized blow molding is imparted to the polycarbonate according to the improved process, melt viscosity is simultaneously increased to prolong molding time, resulting in another drawback such as a delayed molding operation cycle.

Further, processes for production of polycarbonate using phloroglucine or trimellitic acid as a branching agent have heretofore been known, as disclosed in for example, Japanese Patent Publication Nos. 17149/1969, 11733/1985. However, these processes suffer from a disadvantage in that the use of these branching agents is apt to cause coloring owing to a trace quantity of unreacted matter.

Moreover, 1,1,1-tris(4-hydroxyphenyl)ethane is proposed to be used as a branching agent in Japanese Patent Application Laid-Open No. 45318/1984. However, the specification of U.S. Pat. No. 4,415,723 discloses the polymer obtained by using this branching agent is colored to pale yellowish green in Comparative Example A, and suggests to use a branching agent such as 1,1,2-tris(4-hydroxyphenyl)ethane; 1,1,2-tris(4-hydroxyphenyl)propane or the like. However, the process disclosed in the above U.S. Pat. No. 4,415,723 can not completely solve the problems of coloring.

When the polycarbonate is branched for blow molding, its impact resistance is known to decrease. Accordingly, branched polycarbonates with high impact resistance have been expected to be developed.

SUMMARY OF THE INVENTION

An object of the present invention is to provide branched polycarbonates having a melt resistance (melt tension) sufficient to produce large sized blow moldings without increasing melt viscosity.

Another object of the present invention is to provide branched polycarbonates with good hue and improved impact resistance which are suitable for blow molding.

Still another object of the present invention is to provide a process for efficiently producing the branched polycarbonates.

According to the investigation of the present inventors, it has been found that polycarbonates having physical properties within a certain range, which are defined by intrinsic viscosity, branching parameter and degree of branching, increase their melt resistance without increasing melt viscosity. It has been also found that melt resistance increases without increasing melt viscosity, and further heterogeneity of thickness can be improved during molding in polycarbonate, in which taking-off parameter (elongational viscosity ratio) as well as the above physical values fall in certain ranges.

The present invention has been attained based on such findings. That is, the present invention provides branched polycarbonates (hereinafter referred to as PC-1) which comprises having:

(1) an intrinsic viscosity $[\eta]$ in methylene chloride at 20° C. of 0.3 to 2.0 dl/g;

(2) a branching parameter $G=[\eta]/[\eta]_{lin}$ (wherein $[\eta]_{lin}$ means an intrinsic viscosity of straight chain polycarbonate having the same weight average molecular weight as in PC-1 according to light scattering method) of 0.05 to 0.9; and (3) degree of branching $\lambda=n_w/M_w$ (wherein $n_w$ and $M_w$ mean weight average number of branching and weight average molecular weight, respectively) of $0.2 \times 10^{-4}$ to $2.0 \times 10^{-4}$.

Moreover, the present invention provides branched polycarbonates (hereinafter referred to as PC-2) which is characterized in that the taking-off parameter $A=Z_{30}/Z_3$ (wherein $Z_{30}$ and $Z_3$ are elongational viscosity (at the temperature of 200° C. and a constant strain rate of 0.1 $sec^{-1}$) at 30 and 3 seconds, respectively) is 2.5 to 20 while the above (1) intrinsic viscosity $[\eta]$, (2) branching parameter G and (3) degree of branching $\lambda$ satisfy the above requirements.

Further, the present invention provides a process for production of PC-1 (hereinafter referred to as process-1), which comprises reacting dihydric phenols, a polyfunctional organic compound having three or more functional groups and phosgene to produce a polycarbonate oligomer, and then polycondensing the polycarbonate oligomer with dihydric phenols and monohydric phenols under the stirring conditions to give the interfacial area of emulsion of not less than 40 m²(L=liter).

Moreover, the present invention provides a process for production of PC-2 (hereinafter referred to as process-2) which comprises reacting dihydric phenols with phosgene to produce a polycarbonate oligomer, precondensing said polycarbonate oligomer with a polyfunctional organic compound having three or more functional groups under the stirring conditions to give the interfacial area of emulsion of not less than 40 m²/L, and then polycondensing the polycarbonate oligomer with dihydric phenols and monohydric phenols under the stirring conditions to give the interfacial area of the emulsion of not less than 40 m²/L.

DESCRIPTION OF THE PREFERRED EMBODIMENTS

The branched polycarbonates (PC-1) according to the present invention possess the characteristics prescribed in the above (1), (2) and (3). That is, (1) the intrinsic viscosity [η] is 0.30 to 2.0 dl/g, preferably 0.35 to 1.0 dl/g. In this case, the measurement of the intrinsic viscosity [η] is performed by measuring a viscosity of pure solvent, i.e., methylene chloride, $\eta_0$ and tnat of a solution of said branched polycarbonate η in methylene chloride at 20° C. within wide range of polycarbonate concentration c using Ubbellohde improved auto viscometer (for example, manufactured by Rigousha Co., Ltd.). The intrinsic viscosity [η] is calculated using the formula:

$$[\eta] = \lim_{c \to 0} [\{(\eta/\eta_0) - 1\}/c].$$

The branched polycarbonates having an intrinsic viscosity less than 0.3 dl/g suffer from poor impact resistance, while those exceeding 2.0 dl/g are difficult to be molded because of too high molecular weight.

In the PC-1 of the present invention, (2) the branching parameter G is 0.05 to 0.9, preferably, 0.2 to 0.8. In this case, the branching parameter G is defined by the ratio of intrinsic viscosity of PC-1, [η] (intrinsic viscosity in methylene chloride at 20° C.) to that of straight chain polycarbonate having the same weight average molecular weight as PC-1, [η] lin (intrinsic viscosity at 20° C. in methylene chloride); $G = [\eta]/[\eta]_{lin}$. Weight average molecular weight measured by light scattering method. $[\eta]_{lin}$ is calculated using Schultz's viscosity formula: $[\eta]_{lin} = 1.11 \times 10^{-4} M_w 0.82$ when the monomer is bisphenol A. It is calculated using an empirical correlation between intrinsic viscosity and weight-average molecular weight in a straight-chain polycarbonate when a copolymer or a homopolymer of a monomer other than bisphenol A. The branched polycarbonates having branching parameter G over 0.9 are insufficiently improved in blow characteristics, thus they are not suitable for large sized blow molding, while those less than 0.05 are undesirably cross-linked.

Further, in PC-1 of the present invention, (3) the degree of branching λ is $0.2 \times 10^{-4}$ to $2.0 \times 10^{-4}$, preferably $0.4 \times 10^{-4}$ to $1.9 \times 10^{-4}$. The λ is an average number of branching per weight and calculated using the formula: $\lambda n_w/M_w$ wherein $n_w$ is weight average number of branching and $M_w$ is weight average molecular weight. For determination, said branched polycarbonate is fractionated into 10 or more fractions in iso-octane/1,2-dichloroethane by successive fractional precipitation. That is, iso-octane is successively added to 1 wt % solution of branched polycarbonate in 1,2-dichloroethane. The addition of isooctane is stopped at cloud point, and the resultant is allowed to stand to give precipitates, which are removed by filtration, and the above operations are repeated for the supernatant. The weight average molecular weight $M_{wi}$ and branching parameter $G_i$ are measured for the i-th fractional sample of the precipitation samples according to the light scattering method.

The correlation: $G_i^2 = 6/n_{wi}[(\psi/2)\ln\{(\psi+1)/(\omega-1)\} - 1]$ is found between $G_i$ and n using a parameter $\psi = \{(2+n_{wi})/n_{wi}\}^{0.5}$. $n_{wi}$ is calculated from the result of measurement of a branching parameter $G_i$ obtained for each fractional sample using the relation. Thus, weight average number of branching and weight average molecular weight are determined using the formulae: $n_w = \Sigma w_i n_{wi}/\Sigma w_i$ and $M_w = \Sigma w_i M_{wi}/\Sigma w_i$, respectively.

The degree of branching used in the present invention is calculated using thus obtained $n_w$ and $M_w$ by the formula: $\lambda = n_w/M_w$. The branched polycarbonates wherein λ exceeds $2.0 \times 10^{-4}$ is cross-linked, while those with less than $0.2 \times 10^{-4}$ can not retain melt resistance (melt tension) against large sized blow molding without increasing melting viscosity.

The PC-1 of the present invention has the above characteristics (1) to (3) and a branched nucleus structure derived from various kinds of polyfunctional organic compounds having three or more functional groups such as phloroglucine. The molecular weight is not particularly limited. Preferably, the weight average molecular weight is within the range from 20,000 to 150,000.

In an example of PC-1 of the present invention, PC-1 having a branched nucleus structure derived from phloroglucine is specifically represented by the following formula:

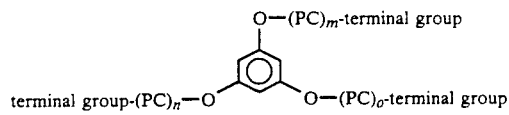

wherein PC represents a polycarbonate chain, and m, n and o represent integers.

In the present invention, the polycarbonates having the above characteristics (1), (2) and (3), and the branched nucleus structure derived from a branching agent represented by the general formula (A):

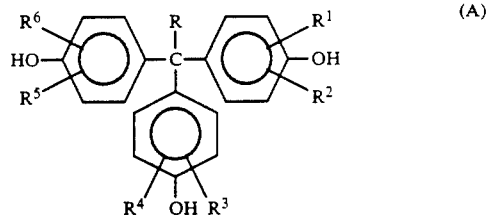

(wherein R is a hydrogen atom, a $C_{1-5}$ alkyl group, $R^1$ to $R^6$ are hydrogen atoms, $C_{1-5}$ alkyl groups or halogen atoms, respectively) are excellent in hue and impact resistance. In the general formula (A), R is a hydrogen atom, a $C_{1-5}$ alkyl group such as methyl, ethyl, n-propyl, n-butyl, n-pentyl and the like. $R^1$ to $R^6$ are hydrogen atoms, $C_{1-5}$ alkyl groups (e.g., methyl, ethyl, n-propyl, n-butyl, n-pentyl) or halogen atoms (e.g., chlorine, bromine, fluorine). The embodiments of the branching agent of the general formula (A) include 1,1,1-tris(4-hydroxyphenyl)methane;
1,1,1-tris(4-hydroxyphenyl)ethane;
1,1,1-tris(4-hydroxyphenyl)propane;
1,1,1-tris(2-methyl-4-hydroxyphenyl)methane;
1,1,1-tris(2-methyl-4-hydroxyphenyl)ethane;
1,1,1-tris(3-mehtyl-4-hydroxyphenyl)methane;
1,1,1-tris(3-methyl-4-hydroxyphenyl)ethane;
1,1,1-tris(3,5-dimethyl-4-hydroxyphenyl)methane;
1,1,1-tris(3,5-dimethyl-4-hydroxyphenyl)ethane;
1,1,1-tris(3-chloro-4-hydroxyphenyl)methane;

1,1,1-tris(3-chloro-4-hydroxyphenyl)ethane;
1,1,1-tris(3,5-dichloro-4-hydroxyphenyl)methane;
1,1,1-tris(3,5-dichloro-4-hydroxyphenyl)ethane;
1,1,1-tris(3-bromo-4-hydroxyphenyl)methane;
1,1,1-tris(3-bromo-4-hydroxyphenyl)ethane;
1,1,1-tris(3,5-dibromo-4-hydroxyphenyl)methane;
1,1,1-tris(3,5-dibromo-4-hydroxyphenyl)ethane and the like.

The preferred embodiments of the PC-1 of the present invention possess a branched nucleus structure derived from a branching agent represented by the above general formula (A), and specifically represented by the following formula:

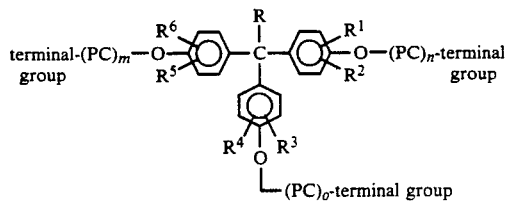

wherein m, a and o are integers, and PC represents a polycarbonate moiety.

For example, when bisphenol A is used as a starting material component, PC represents a repeating unit of the following formula:

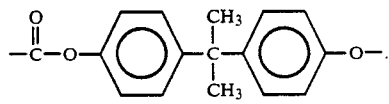

A viscosity average molecular weight of PC-1 having the above structure is preferably above 15,000 to 40,000. When it is less than 15,000, impact resistance is decreased and if it is in excess of 40,000, moldability is reduced.

The above PC-1 wherein the acetone-soluble matter is not more than 3.5% by weight is particularly preferred. When the acetone-soluble matter exceeds 3.5% by weight, impact resistance is markedly decreased. The acetone-soluble matter as used herein refers to a component extracted from the objective polycarbonate in a Soxhlet extraction using acetone as a solvent.

The branched polycarbonate (PC-2) according to the present invention possesses the characteristics prescribed in the above (1), (2) and (3), and characterized in that the above (4) taking-off parameter $A = Z_{30}/Z_3$ (wherein $Z_{30}$ and $Z_3$ are elongational viscosity (at the temperature of 200° C. and a constant strain rate of 0.1 sec$^{-1}$) at 30 and 3 seconds, respectively) is 2.5 to 20.

Such polycarbonates (PC-2) of the characteristics (1), (2), (3) and (4) possess excellent properties of the above described polycarbonate (PC-1) and accompanied with less heterogeneity of thickness during molding. In this case, (1), (2) and (3) are the same as mentioned above, and (4) the taking-off parameter A defined above is 2.5 to 2.0, preferably, 3.0 to 10. For measurement of the taking-off parameter A, said branched polycarbonate is molded into a cylindrical sample with a diameter of 3 mm through a small extruder (e.g., manufaotured by Tanabe Plastic Co., Ltd., aperture, 20 mm; revolution, 40 rpm; set temperature, 280° C.), which is allowed to stand in silicone oil at 200° C. for 15 minutes. Subsequently, the resultant is set on a revolving roller of a stretching rheometer (manufactured by, for example, Iwamoto Seisakusho Co., Ltd.), the sample is smooth out, stretched at a fixed revolving speed, and the change in tension and diameter of the sample with time is observed using a video tape recorder equipped with a timer. The strain rate is calculated from the result of measurement of change in diameter with time according to the formula:

$$\ln (d_t/d_O) = -(\epsilon/2)t$$

wherein $d_O$ is an initial diameter, $d_t$ is a diameter at t second, and $\epsilon$ is a strain rate. Further, the elongational viscosity, $Z_t$ is obtained from the strain rate $\epsilon$ according to the formula: $Z_t = F_t/S_t\epsilon$ (wherein $F_t$ and $S_t$ are tension and sectional area at time, t, respectively, and $S_t$ can be calculated from $d_t$). The taking-off parameter A can be calculated as a ratio of the elongational viscosit $Z_{30}$ to the elongational viscosity $Z_3$, $Z_{30}/Z_3$. Therein, $Z_{30}$ is defined as the value of the elongational viscosity measured under the condition of 30 seconds, a temperature of 200° C. and a constant strain rate of 0.1 sec$^{-1}$. $Z_3$ is defined as the value of elongational viscosity measured under the condition of 3 seconds, a temperature of 200° C. and a constant strain rate of 0.1 sec$^{-1}$.

When the taking-off parameter A of the branched polycarbonate is less than 2.5, molecules of the polycarbonate may readily become disentangled and an increase in viscosity upon elongation is small and the heterogeneity of thickness upon molding becomes great. When the taking-off parameter A exceeds 20, the product may be undesirably broken upon elongation during melting.

The PC-2 of the present invention, which possesses the above characteristics (1) to (4), preferably has a branched nucleus structure derived from a branching agent represented by the above general formula (A). Like the above polycarbonate (PC-1), a branched polycarbonate having a branched nucleus structure derived from a branching agent, 1,1,1-tris(4-hydroxyphenyl)eihane, which is represented by the above general formula (A) wherein R is a methyl group and all of $R^1$ to $R^6$ are hydrogen atoms is especially preferred. The molecular weight of the PC-2 is not particularly limited. Preferably, weight average molecular weight is in the range from 20,000 to 150,000.

Further, the PC-2 with viscosity average molecular weight of above 15,000 to 40,000, the wherein acetone-soluble matter is not more than 3.5% is preferred because of its excellent impact resistance, moldability and the like. That is, when the acetone-soluble matter is reduced to not more than 3.5%, the transition temperature of ductility-brittle fracture of Izod impact strength decreases by 5° to 10° C., resulting in an improved impact strength at low temperature.

The processes for producing the above PC-1 and PC-2 will be explained below.

The branched polycarbonate having a certain branched nucleus structure described for PC-1 may be produced by the above mentioned process-1, i,e., via two steps of the following oligomerization and polycondensation. Firstly, a polycarbonate oligomer is derived from dihydric phenols, a polyfunctional organic compound having three or more functional groups and phosgene. Subsequently, dihydric phenols and monohydric phenols which are terminal stoppers are added to thus obtained oligomer or co-oligomer, further a catalyst is added to the solvent as needed and polycondensation is carried out.

As the dihydric phenols used for production of branched polycarbonate oligomers, bisphenols are preferred. Particularly, 2,2-bis(4-hydroxyphenyl)propane (bisphenol A) is preferred. This bisphenol A is partly or completely substituted by other dihydric phenols. Dihydric phenols other than bisphenol A include various bisphenols. The embodiment of bisphenols other than bisphenol A includes, for example, dihydroxyaryl alkanes such as bis(4-hydroxyphenyl) methane, bis(4-hydroxyphenyl)phenylmethane, bis(4-hydroxyphenyl)-naphthylmethane, bis(4-hydroxyphenyl)-(4-isobutylphenyl)methane, diphenyl-bis(4-hydroxyphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl) propane, 2,2-bis(3,5-dichloro-4-hydroxyphenyl)propane, 2,2-bis(3,5-dibromo-4-hydroxyphenyl)pronane, 2,2-bis(3-chloro-4-hydroxyphenyl)propane, 2,2-bis(3-methyl-4-hydroxyphenyl) propane, 2,2-bis(3-fluoro-4-hydroxyphenyl)propane, 1,1-bis(4 -hydroxyphenyl)butane, 2,2-bis(4-hydroxyphnenyl)butane, 1,4-bis(4-hydroxyphenyl)butane, 1,1-bis(4-hydroxyphenyl) isobutane, 2,2-bis(4-hydroxyphenyl)pentane, 4-methyl-2,2-bis(4-hydroxyphenyl)pentane, 1,1-bis(4-hydroxyphenyl) cyclohexane, 1,1-bis(3,5-dichloro-4-hysroxyphenyl) cyclohexane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl) cyclododecane, 2,2-bis(4-hydroxyphenyl)propane, and 2,2-bis(4-hydroxyphenyl)butane; dihydroxyarylsulfones such as bis(4-hydroxyphenyl)sulfone, bis(3,5-dimethyl-4-hydroxyphenyl)sulfone, and bis(3-chloro-4-hydroxyphenyl)sulfone; dihydroxyarylethers such as bis(4-hydroxyphenyl)ether, and bis(3,5-dimethyl-4-hydroxyphenyl)ether; dihydroxyarylketones such as 4,4'-dihydroxybenzophenone, and 3,3',5,5'-tetramethyl-4,4'-dihydroxybenzophenone; dihydroxyarylsulfides such as bis(4-hydroxyphenyl)sulfide, bis(3-methyl-4-hydroxyphenyl)sulfide, and bis(3,5-dimetyl-4-hydroxyphenyl)sulfide; dihydroxyarylsulfoxides such as bis(4-hydroxyphenyl) sulfoxide; dihydroxydiphenyls such as 4,4'-dihydroxydiphenyl; dihydroxybenzenes such as hydroquinine, resolcynol, and methylhydroquinone; dihydroxynaphthanlenes such as 1,5-dihydroxynaphthalene, and 2,6-dihydroxynaphthalene. These dihydric phenols may be used alone or in a combination of two or more of them.

As the branching agents used in the step for production of the above polycarbonate oligomer, i.e. the polyfunctional organic compound having three or more functional groups; there can be listed those having three or more functional groups (such as a hydroxyl group, a carboxyl group, an amino group, an imino group, a formyl group, an acid halide group, and a haloformate group) in one molecule. The branching agents include phloroglucine, mellitic acid, trimellitic acid, trimelltic acid chloride, trimellitic anydride, gallic acid, n-propyl gallate, protocatechuic acid, pyromellitic acid, pyromellitic dianhydride, α-resorcylic aid, β-resorcylic acid, resorcylic aldehyde, trimellityl chloride, trimellityl trichloride, 4-chloroformylphthalic anhydride, benzophenone tetracarboxylic acid, 2,4,4'-trihydroxybenzophenone, 2,2',4,4'-tetrahydroxybenzophenone, 2,4,4'-trihydroxyphenylether, 2,2',4,4'-tetrahydroxyphenylether, 2,4,4'-trihydroxydiphenyl-2-propane, 2,2'-bis(2,4-dihydroxy)propane, 2,2',4,4'-tetrahydroxydiphenylmethane, 2,4,4'-trihydroxydiphenylmethane, 1-(α-methyl-α-(4'-hydroxypheyl) ethyl)-4-(α', α'-bis(4''-hydroxyphenyl)ethyl)benzene, α, α', bis(2'-hydroxy-5'-methylbenzyl)-4-methylphenol, 4,6-dimethyl-2,4,6-tris(4'-hydroxyphenyl)heptene-2,4,6-dimethyl-2,4,6-tris(4'-hydroxyphenyl)heptane-2, 1,3,5-tris(4'-hydroxyphenyl) benzene, 1,1,1-tris(4'-hydroxyphenyl)ethane, 2,2-bis(4,4-bis(4'-hydroxyphenyl)cyclohexyl)-propane, 2,6-bis(2'-hydroxy-5'-isopropylbenzyl)-4-isopropylphenol, bis(2-hydroxy-3-(2' -hydroxy-5'-methylbenzyl)-5-methylphenyl) methane, bis(2-hydroxy-3-(2'-hydroxy-5'-isopropylbenzyl)-5-methylphenyl) methane, tetrakis(4-hydroxyphenyl)methane, tris(4-hydroxyphenyl)phenylmetane, 2',4',7-trihydroxyflavan, 2,4,4-trimethyl-2',4',7-trihydroxyflavan, 1,3-bis(2',4'-dihydroxyphenylisopropyl)benzene, tris(4'-hydroxyaryl)amyl-s-triazine, and 1-(α-methyl-α-(4'-hydroxyphenyl)ethyl)-3-(α', α'-bis(4''-hydroxyphenyl)ethyl)benzene. These branching agents may be used alone or in a combination of two or more of them. Among them, the branching agent represented by the above general formula (A) is especially preferred from the viewpoint of physical properties of the resulting polycarbonate. Particularlry, 1,1,1-tris-(4-hydroxyphenyl)ethane is preferred.

In the process-1 of the present invention, it is preferable to use a solvent. Such solvent includes, for example, chlorinated hydrocarbons such as dichloromethane (methylene chloride), 1,1-dichloroethane, 1,2-dichloroethane, 1,1,1-trichloroethane, 1,1,2-trichloroethane, 1,1,2,2-tetrachloroethane, pentachloroethane, hexachloroethane, chlorobenzene, chloroform, and carbon tetrachloride; acetophenone and the like. These solvents may be used alone or two or more of them may be mixed. Among them, methylene chloride is particularly preferred.

The polycarbonate oligomer used in the process-1 of the present invention may be obtained by reacting the above aromatic dihydric phenols, compounds having three or more functional groups and phosgene by the known method. In this case, conditions and the like are not particularly limited.

A preferable embodiment of the production of the above polycarbonate oligomer is as follows: A reaction mixture containing these components is firstly allowed to react while stirring so that the reaction mixture is in a turbulent flow. In connection with stirring, there are no special limitations to stirring speed and the like, as long as the reaction is allowed to proceed in the state that the reaction mixture is in a turbulent flow. Generally it suffices that the stirring is carried out at a stirring speed of not less than 400 rpm. The amount of the branching agent may be such that the branching agent unit content in the desired branched polycarbonate is generally 0.05 to 2.0 mol %, preferably 0.1 to 1.0 mol % based on the dihydric phenol unit. The reaction temperature is 0° to 50° C., preferably 5° to 40° C. The reaction time varies depending on various conditions. Generally, it is sufficient to conduct the reaction for 10 minutes to 6 hours, preferably 30 minutes to 3 hours at the above stirring rate. The.polymerization degree of the oligomer or co-oligomer obtained by the above reaction is not more than 20, preferably 2 to 10.

In the process-1 of the present invention, the thus prepared polycarbonate oligomer and dihydric phenols are used as starting materials for polymerization, to which are added monohydric phenol as a terminal stopper and further a catalyst to prepare a reaction mixture. In this case, dihydric phenols are preferably added to the reaction system as an aqueous solution of caustic alkali such as sodium hydroxide, potassium hydroxide or the like.

Dihydric phenols to be added may be the same or different from those in the above mentioned oligomerization. The amount of dihydric phenols is 0.4 to 0.55, preferably 0.45 to 0.5 as a molar ration based on a chloroformate group in the oligomer.

Various kinds of terminal stoppers may be used. The example includes monohydric phenol, for example, p-tert-butylphenol, phenol, p-cumylphenol, p-tert-octylphenol, pentabromophenol, and tribromophenol. p-tert-Butylphenol is preferred. The amount of the monohydric phenol is 0.02 to 0.20, preferably, 0.04 to 0.17 as a molar ratio based on a chloroformate group in the oligomer.

The catalyst includes a tertiary amine such as triethylamine and a halogen salt of quaternary ammonium such as tetraethyl ammonium chloride. The amount of the catalyst is $1.0 \times 10^{-3}$ to $1.0 \times 10^{-2}$ mole, and preferably $1.0 \times 10^{-3}$ to $5.0 \times 10^{-3}$ mole per mole of the chloroformate group in the oligomer.

In the process-1 of the present invention, a reaction mixture containing oligomer or co-oligomer, dihydric phenol, monohydric phenol and a catalyst is subjected to polycondensation with stirring. The reaction mixture is stirred in such a way that the interfacial area of the emulsion is not less than 40 m$^2$/L, preferably 50 to 1,000 m$^2$/L. Any methods can be employed for stirring. It is preferable to set a baffle in a reactor or to use a homogenizer.

The interfacial area A of the emulsion while stirring may be obtained by measuring dispersed phase volume fraction $\phi$ and dispersed phase average diameter d according to a micrograph of the emulsion and calculating by the formula: $A = 6\phi/d$ using the result.

In the process-1 of the present invention, the polycondensation is continued until the viscosity of th reaction mixture increases. The reaction time varies depending on the various conditions. Generally, it suffices that the reaction is performed for 30 minutes to 2 hours under the above stirring conditions.

When the compound represented by the above general formula (A) is used as a branching agent in the process-1 of the present invention to further produce polycarbonate wherein the acetone-soluble matter is not more than 3.5%, it is preferable to operate as follows. That is, dihydric phenols, a branching agent represented by the general formula (A) and phosgene are first allowed to react as mentioned above to produce polycarbonate oligomer, further dihydric and monohydric phenols are subjected to polycondensation while stirring in such a way that the interfacial area of the emulsion is not less than 40 m$^2$/L. Subsequently, when the viscosity of the reaction mixture increases, an aqueous alkali solution (sodium hydroxide, potassium hydroxide or the like) is added and polycondensation is carried out under the stirring conditions so that the interfacial area of the emulsion of the reaction mixture is not more than 30 m$^2$/L while a catalyst is added to produce the desired polycarbonate. In this case, the conditions wherein the interfacial area should be not more than 30 m$^2$/L mean that stirring may be preformed in a laminar flow. Preferably, about 10 to 30 m$^2$/L. The stirring conditions can not be determined unconditionally. Generally, it suffices that the stirring rate is not more than 300 rpm. The reaction time varies depending on various conditions. Generally, it is about 30 minutes to 2 hours at the above stirring rate. The increase in viscosity can not be necessarily specified numerically. Thus choosing the converting point is sufficiently carried out by visually observing a change in viscosity of the reaction mixture. Such addition of the alkaline solution by visual observation and the determination of the conversion point to laminar flow may be made relatively easily.

The branched polycarbonate having a specific branched nucleus structure mentioned above (PC-2) may be produced by the above mentioned process-2, i.e., via three steps of the following oligomerization, pre-condensation and polycondensation. Firstly, polycarbonate oligomer is derived from dihydric phenols and phosgene. Subsequently, thus obtained oligomer and a polyfunctional organic compound having three or more functional groups as a branching agent are subjected to pre-condensation under stirring conditions to make an interfacial area of the emulsion not less than 40 m$^2$/L. Then the above pre-condensate is subjected to polycondensation with dihydric phenols and monohydric phenols which are terminal stoppers under stirring conditions to make the interfacial area of the emulsion not less than 40 m$^2$/L. In each process, a catalyst and solvent may be added as needed.

Dihydric phenols and solvent used for the production of the polycarbonate oligomer are the same as mentioned above.

In the step for production of the polycarbonate oligomer, a mixture of one or two or more of the above dihydric phenols are dissolved and mixed in the above inert organic solvent as needed and allowed to react with phosgene by the known method. In one embodiment, a reaction mixture containing these components is allowed to react while stirring so that the reaction mixture is in a turbulent flow. The stirring rate is not particularly limited, so long as the reaction proceeds in the state that the reaction mixture is in a turbulent flow. Generally, it suffices that the stirring is carried out at not less than 400 rpm. The reaction temperature is 0° to 50° C., preferably 5° to 40° C.. The reaction time varies depending on various circumstances, generally it is sufficient that the reaction is performed for 10 minutes to 6 hours, preferably 30 minutes to 3 hours at the above stirring rate. The polymerization degree of the oligomer and co-oligomer obtained in the above reaction steps is not more than 20, preferably 2 to 10.

In the process-2, the branching agent used in the pre-condensation steps, that is, a polyfunctional organic catalyst are as mentioned above. Especially, those represented by the general formula (A) is preferred as the branching agent.

As mentioned above, the above branching agent and a catalyst are added to the polycarbonate oligomer to conduct pre-condensation. In this case, the branching agent is generally 0.1 to 2.0 mol %, preferably 0.1 to 1.0 mol % as a branching agent unit content in the finally obtained branched polycarbonate based on the dihydric phenol unit, and added to the reaction solution with an aqueous solution of sodium hydroxide. In this case, the amount of sodium hydroxide is 1 to 2, preferably 1.1 to 1.5 as an equivalence ratio based on phenolic hydroxyl group of the branching agent. The aqueous phase in the reaction solution is 0.1 to 5, preferably 0.2 to 2 of the organic phase as a volume ratio. Pre-condensation reaction is carried out by setting a baffle in a reactor containing the mixture of these components or using a homogenizer to stir in such a way that the interfacial area of the emulsion be not less than 40 m$^2$/L, preferably, 50 to 1,000 m$^2$/L. When the stirring of less than 40 m$^2$/L, the degree of branching might be reduced. This pre-condensation is carried out before the following polycondensation to reduce short branching, to prevent reaction between branching agents and to produce branched polycarbonates having the desired physical properties.

According to the process-2 of the present invention, dihydric phenols and monohydric phenols as terminal stoppers are finally added to the pre-condensed reaction solution consisting of oligomer or co-oligomer, a branching agent, λ catalyst and a solvent to conduct polycondensation. In this case, the dihydric phenols may be the same or different from those used for oligomerization. Similarly, monohydric and dihydric phenols are added as an aqueous sodium hydroxide solution. The reaction mixture containing them is subjected to polycondensation with stirring.

The organic phase in the polycondensation reaction solution is 0.1 to 5, preferably 0.2 to 2 as a volume ratio based on the aqueous phase. The amount of dihydric phenols is 0.4 to 0.55, preferably 0.45 to 0.5 as a molar ratio based on the chloroformate group in the oligomer.

As the monohydric phenols as terminal stoppers, various types mentioned for the process-1 may be used. Particularly, p-tert-butylphenol is preferred. The amount of monohydric phenol is 0.02 to 0.20, preferably 0.04 to 0.17 as a molar ratio based on the chloroformate group in the oligomer.

Stirring of the reaction mixture may be conducted in such a way that the interfacial area of the emulsion be not less than 40 m$^2$/L, preferably 50 to 1,000 m$^2$/L. The method for stirring may not be limited. It is preferable to set a baffle in a reactor or to use a homogenizer. The interfacial area A in the stirring condition may be calculated by determining dispersed phase volume fraction $\phi$ and dispersed phase average diameter d with a micrograph of the emulsion and using a formula: $A6\phi/d$ as mentioned above.

In the present invention, this polycondensation is continued before the viscosity of the reaction mixture increases. The reaction time varies depending on various circumstances. Preferably, the reaction is carried out for about 30 minutes to 2 hours under the stirring conditions mentioned above.

When the compound represented by the above general formula (A) is used as a branching agent to further produce polycarbonate with acetone-soluble matter not more than 3.5% in the above process-2, it is preferable to conduct as follows. That is, polycarbonate oligomer derived from aromatic dihydric phenols and phosgene and a branching agent of the above general formula (A) are subjected to pre-condensation with stirring under the conditions so that the interfacial area of the emulsion of the reaction mixture containing them is not less than 40 m$^2$/L. Subsequently, polycondensation of the resulting pre-condensate with aromatic dihydric phenols and monohydric phenols is carried out under the stirring conditions to make the interfacial area of the emulsion not less than 40 m$^2$/L, and an aqueous alkali solution is added at the point when the viscosity of the reaction mixture increases, and polycondensation is carried out under the stirring conditions to make the interfacial area of the emulsion not more than 30 m$^2$/L (that is under laminar flow conditions) to provide the desired polycarbonate.

Post-treatment step of the resulting reaction mixture such as washing or separation provides the desired branched polycarbonates of high purity.

As mentioned above, novel branched polycarbonates excellent in impact resistance can be obtained by the present invention, and further novel branched polycarbonates having excellent impact resistance and with extremely reduced heterogeneity of thickness are obtained.

Further, novel polycarbonates with improved hue and the like are obtained by selecting starting materials. These polycarbonates are especially suitable for large sized blow molding. Therefore, in the blow moldings obtained using such polycarbonates as starting materials, impact resistance, heterogeneity of thickness, hue and the like are markedly improved compared with the conventional products.

Moreover, the above branched polycarbonates may be efficiently produced according to the present invention, and the resulting polycarbonates are excellent in quality.

Accordingly, the branched polycarbonates of the present invention can be effectively used as starting materials for various moldings, especially large sized blow moldings.

The present invention will be further explained in detail in the following examples and comparative examples.

EXAMPLE 1

Bisphenol A (2,200 g, 9.7 mol), 1-[α-methyl-α-(4'-hydroxyphenyl)ethyl]-4-[α',α'-bis(4''-hydroxyphenyl)ethyl]-benzene (29.3 g, 0.069 mol) as a branching agent, 2.0 N aqueous sodium hydroxide solution (13.6 L) and methylene chloride (8 L) were charged in a 50 L vessel with a stirrer, phosgene was blown into the resulting mixture for 70 minutes, then an aqueous phase and an organic phase were separated. Thus, a solution of polycarbonate oligomer in methylene chloride at a concentration of 320 g/L was obtained. The chloroformate concentration in this solution was 0.7 eq/L.

Thus obtained solution of polycarbonate oligomer in methylene chloride (8 L), and bisphenol A (573 g, 2.5 mol), 7.25 % by weight aqueous sodium hydroxide solution (4,000 g), triethylamine (4.4 g, 0.043 mol), p-tert-butylphenol (70.4 g, 0.47 mol) and methylene chloride (6 L) were added to the homogenizer, and polycondensation was performed for 60 minutes while stirring in such a manner that the interfacial area of the emulsion was 90 to 100 m$^2$/L.

The resulting reaction mixture was separated into an aqueous phase and a methylene chloride phase containing the product polymer, and said methylene chloride phase was washed sequentially with water, acid (0.1 N hydrochloric acid) and water. Methylene chloride was removed from this organic phase at 40° C. under reduced pressure to give a polycarbonate as white powder.

EXAMPLES 2 TO 8

The same operation as in Example 1 was carried out, with the exception that the branching agent was substituted by the following compounds, to produce polycarbonates.

That is, phloroglucine, 4,4'-trihydroxybenzophenone, α,α',α"-tris(4-hydroxyphenyl)-1,3,5-isopropylbenzene, 2,6-bis(2'-hydroxy-5'-methylbenzyl)-4-methylphenol, trimellitic acid, isatin-bis(o-cresol) and 2,6-dimethyl-2,4,6-tri(4-hydroxyphenyl)heptan-3-ene were used an branching agents in Examples 2, 3, 4, 5, 6, 7 and 8, respectively.

COMPARATIVE EXAMPLE 1

The same operation as in Example 1 was carried out, with the exception that interfacial area of the emulsion was 30 m$^2$/L, to produce a polycarbonate.

COMPARATIVE EXAMPLE 2

The same operation as in Example 2 was carried out, with the exception that the interfacial area of emulsion was 30 m$^2$/L, to produce a polycarbonate.

COMPARATIVE EXAMPLE 3

The same operation as in Example 1 was carried out, with the exception that p-tert-butylphenol (70.4 g) was added at the beginning, to produce polycarbonate.

COMPARATIVE EXAMPLE 4

The same operation as in Example 2 was carried out, with the exception that p-tert-butylphenol (70.4 g) was added at the beginning, to produce a polycarbonate.

COMPARATIVE EXAMPLE 5

The same operation as in Example 2 was carried out, with the exception that phloroglucine (1.5 g, 0.012 mol) was used as a branching agent, and p-tert-butylphenol (70.4 g) was added at the beginning, to produce a polycarbonate.

COMPARATIVE EXAMPLE 6

A mixture of bisphenol A (228 g, 1 mol), p-tertbutylphenol (4.9 g), 1-[α-methyl-α-(4'-hydroxyphenyl)ethyl]-[α',α'-bis(4"-hydroxyphenyl)ethyl]benzene (4.24 g, 0.01 mol) as a branching agent, 9 wt % aqueous sodium hydroxide solution (1,375 g) and methylene chloride (2,300 g) was stirred at 20 to 25° C. under a nitrogen atmosphere while phosgene (121 g) was blown over 2 hours. After completion of blowing of phosgene, triethylamine (0.4 g) was added and stirring was further continued for 1 hour.

After the reaction was over, an aqueous phase and a methylene chloride phase containing the product polymer were separated, and said methylene chloride phase was sequentially washed with water, acid (0.1 N hydrochloric acid) and water. Methylene chloride was removed from the organic phase at 40° C. under reduced pressure to give a polycarbonate as white powder.

COMPARATIVE EXAMPLE 7

Distilled water (220 g), bisphenol A (110 g, 0.48 mol), triethylamine (1 g), trimellitic acid (0.7 g, 0.0035 mol) as a branching agent and phenol (1.5 g) were dispersed in methylene chloride (700 ml). Subsequently, phosgene was added to the dispersion at about 1 g/L for about 20 minutes, then about 2.2 g/L for about 20 minutes and finally at about 1.3 g/L for about 20 minutes. During the addition of phosgene, pH was maintained at 4 to 6 for first 20 minutes, then increased to 10.5 to 11.5. In this case, pH was controlled by adding 25 wt % aqueous sodium hydroxide solution.

After the reaction was over, the resulting product was separated into an aqueous phase and a methylene chloride phase containing product polymer, said methylene chloride phase was sequentially washed with water, acid (0.1 N hydrochloric acid) and water. Methylene chloride was removed from the organic phase at 40° C. under reduced pressure to give polycarbonate as white powder.

COMPARATIVE EXAMPLE 8

Bisphenol A (228 g, 1 mol) and isatin-bis(α-cresol) (0.634 g, 0.02 mol) as a branching agent were dissolved in 6.2% by weight aqueous sodium hydroxide solution (2,100 g) under a nitrogen atmosphere.

A solution of p-tert-butylphenol (3.8 g) in unstabilized methylene chloride (2,500 g) was added, and phosgene (125 g) was added at pH 13 to 14 and at 25 ° C. over one hour with vigorous stirring.

Subsequently, triethylamine (0.6 g) and 45% by weight aqueous sodium hydroxide (40 ml) were added and the resultant was allowed to react for another one hour.

After reaction was over, the resulting reaction product was separated into an aqueous phase and a methylene chloride phase containing the product polymer, and said methylene chloride phase was washed sequentially with water, acid (0.1 N hydrochloric acid) and water. Methylene chloride was removed from the organic phase at 40° C. under reduced pressure to give polycarbonate as white powder.

The results of the measurements of intrinsic viscosity, weight average molecular weight, branching paramenter G, weight average molecular weight and weight average number of branching calculated using the fractioned samples, degree of branching λ, melt viscosity, melt tension and notched Izod impact strength for all polycarbonates obtained in Examples 1 to 8 and Comparative Examples 1 to 8 are shown in Table 1.

TABLE 1

| No. | Intrinsic Viscosity [η] (dl/g) | Weight Average Molecular Weight $M_w$ | Branching Parameter G | Base on Fractioned Sample | | Degree of Branching $10^{-4}\lambda$ | Melt[1] Viscosity (poise) | Melt[2] Tension (g) | Izod Impact Strength (notched) (kgcm/cm) |
|---|---|---|---|---|---|---|---|---|---|
| | | | | Weight Average Number of Branching $n_w$ | Weight Average Molecular Weight $M_w$ | | | | |
| Example 1 | 0.50 | 67,100 | 0.50 | 6.3 | 66,000 | 0.955 | 16,100 | 13.4 | 95 |
| Example 2 | 0.58 | 67,000 | 0.58 | 2.7 | 67,000 | 0.403 | 16,000 | 9.5 | 89 |
| Example 3 | 0.56 | 67,000 | 0.54 | 3.7 | 66,800 | 0.554 | 15,700 | 10.2 | 94 |
| Example 4 | 0.54 | 66,500 | 0.54 | 4.6 | 67,000 | 0.686 | 15,900 | 11.1 | 91 |
| Example 5 | 0.52 | 65,400 | 0.53 | 3.4 | 65,000 | 0.523 | 15,700 | 10.9 | 90 |
| Example 6 | 0.53 | 65,800 | 0.53 | 2.9 | 65,700 | 0.441 | 15,300 | 9.8 | 94 |
| Example 7 | 0.55 | 65,500 | 0.56 | 4.9 | 65,500 | 0.748 | 15,300 | 11.5 | 90 |
| Example 8 | 0.55 | 66,000 | 0.55 | 5.2 | 65,400 | 0.795 | 15,400 | 12.3 | 92 |

TABLE 1-continued

| No. | Intrinsic Viscosity [η] (dl/g) | Weight Average Molecular Weight $M_w$ | Branching Parameter G | Base on Fractioned Sample | | Degree of Branching $10^{-4} \lambda$ | Melt[1] Viscosity (poise) | Melt[2] Tension (g) | Izod Impact Strength (notched) (kgcm/cm) |
| --- | --- | --- | --- | --- | --- | --- | --- | --- | --- |
| | | | | Weight Average Number of Branching $n_w$ | Weight Average Molecular Weight $M_w$ | | | | |
| Comparative Example 1 | 0.55 | 49,000 | 0.71 | 1.0 | 50,500 | 0.198 | 15,800 | 6.1 | 90 |
| Comparative Example 2 | 0.54 | 45,600 | 0.74 | 0.8 | 45,500 | 0.176 | 16,100 | 5.5 | 92 |
| Comparative Example 3 | 0.56 | 49,500 | 0.71 | 1.0 | 52,000 | 0.192 | 15,600 | 5.8 | 92 |
| Comparative Example 4 | 0.54 | 45,000 | 0.74 | 0.7 | 47,200 | 0.148 | 16,300 | 6.2 | 94 |
| Comparative Example 5 | 0.53 | 33,900 | 0.92 | 0.3 | 34,200 | 0.082 | 15,300 | 1.2 | 90 |
| Comparative Example 6 | 0.53 | 45,500 | 0.72 | 0.9 | 46,000 | 0.196 | 15,600 | 5.3 | 90 |
| Comparative Example 7 | 0.54 | 46,000 | 0.73 | 0.8 | 47,600 | 0.168 | 16,200 | 6.3 | 90 |
| Comparative Example 8 | 0.55 | 46,400 | 0.74 | 0.9 | 46,000 | 0.196 | 15,500 | 5.4 | 90 |

[1] Viscosity at the temperature of 280° C., shear rate of 243 sec$^{-1}$, and orifice of L/D = 20/1
[2] Tension given at the temperature of 280° C., take-off speed of 60 rpm and orifice L/D = 8/2.1

Polycarbonates obtained in Examples 1 to 8 have a low melt viscosity under high shearing force and a high melt tension under low shearing force. Thus, the present invention has succeeded in maintaining melt resistance sufficient for producing large sized blow moldings without increasing melt viscosity.

EXAMPLE 9

Bisphenol A (2,200 g, 9.7 mol), 2.0 N aqueous sodium hydroxide solution (13.6 L) and methylene chloride (8 L) were charged and stirred in a 50 L vessel equipped with a stirrer, phosgene was blown therein for 70 minutes, then an aqueous phase and an organic phase were separated. Thus, a solution of polycarbonate oligomer in methylene chloride (concentration: 320 g/L) was obtained. The chloroformate concentration in this solution was 0.7 mol/L.

The obtained solution of polycarbonate oligomer in methylene chloride (8 L), 1,1,1-tris(4-hydroxyphenyl)ethane (21.1 g, 0.069 mol) as a branching agent, 0.5% by weight aqueous sodium hydroxide solution (2,200 g) and triethylamine (4.4 g, 0.043 mol) were added in a homogenizer, and reacted for 60 minutes while stirring in such a way that the interfacial area of the emulsion was 90 m$^2$/L to 100 m$^2$/L.

After the reaction was over, bisphenol A (573 g, 2.5 mol), 7.25% by weight aqueous sodium hydroxide solution (4,000 g), p-tert-butylphenol (70.4 g, 0.47 mol) and methylene chloride (6 L) were added and reacted while stirring in such a way that the interfacial area of the emulsion was 90 m$^2$/L to 100 m$^2$/L.

After 60 minutes, the resulting reaction mixture was separated into an aqueous phase and a methylene chloride phase containing the produced polymer, and the methylene chloride phase was washed sequentially with water, acid (0.1 N hydrochloric acid) and water. Methylene chloride was removed from the organic phase at 40° C. under reduced pressure to give a polycarbonate as white powder.

EXAMPLES 10 TO 12

The same operation as in Example 9 was carried out, with the exception that the branching agent was substituted with the following compounds, to produce a polycarbonate. That is, tris(4-hydroxyphenyl)-methane, phloroglucine and 1-[α-methyl-α-(4'-hydroxyphenyl)-ethyl]-4-[α',α'-bis(4"-hydroxyphenyl)ethyle]benzene were used as branching agents in Example 10, 11 and 12, respectively.

The results of the measurement of intrinsic viscosity, weight average molecular weight, branching parameter G, weight average molecular weight and weight average number of branching calculated using the fractioned samples, degree of branching λ, melt viscosity, melt tension, and taking-off parameter in the polycarbonates obtained in Examples 10, 11 and 12 are shown in Table 2. Thickness of the sidewall and the convex of vessels made from the polycarbonates are also shown in Table 2. The measurement of the thickness of the sidewall and the convex of the above test vessels was for quantitative evaluation of heterogeneity of thickness during molding, and carried out by molding the polycarbonates into 20 L vessels using an accumulator (manufactured by Ishikawajima-Harima Heavy Industries Co., Ltd.; die, 90 mmφ; for 10 L), cutting the sidewall of the vessels perpendicularly to the pinch-off and the thickness was measured at 6 points with different heights, and further the top of the molded vessels, near to the convex portion of the mold, was cut perpendicularly to the pinch-off and the minimum thickness was measured using calipers.

TABLE 2

| No. | Intrinsic Viscosity [η] | Weight Average Molecular Weight $M_w$ | Branching Parameter G | By Fractional Precipitation | |
| --- | --- | --- | --- | --- | --- |
| | | | | Weight Average Number of Branching $n_w$ | Weight Average Molecular Weight $M_w$ |
| Example 9 | 0.50 | 67,500 | 0.49 | 6.4 | 65,900 |
| Example 10 | 0.58 | 66,500 | 0.58 | 5.7 | 66,500 |
| Example 11 | 0.56 | 65,800 | 0.56 | 4.7 | 66,200 |

TABLE 2-continued

| No. | Degree of Branching $10^4 \lambda$ | Melt[1] Viscosity (poise) | Melt[2] Tension (g) | Taking-off Parameter A | Thickness of Sidewall (mm) | Thickness of Convex (mm) |
| --- | --- | --- | --- | --- | --- | --- |
| Example 12 | 0.54 | 66,500 | 0.54 | 4.2 | | 66,800 |
| Example 9 | 0.971 | 16,200 | 13.9 | 6.2 | 2.03 | 1.96 |
| Example 10 | 0.857 | 15,900 | 11.5 | 6.0 | 2.10 | 1.92 |
| Example 11 | 0.710 | 15,700 | 10.2 | 4.7 | 1.95 | 1.68 |
| Example 12 | 0.629 | 15,900 | 9.9 | 5.0 | 1.94 | 1.73 |

[1] Viscosity at the temperature of 280° C., shear rate of 243 sec$^{-1}$, and orifice of L/D = 20/1
[2] Tension given at the temperature of 280° C., take-off speed of 60 rpm and orifice L/D = 8/2.1

Table 2 shows that the branched polycarbonates obtained in Examples 9 to 12 are markedly improved in the result of the measurement of taking-off parameter and thickness of the convex of the test vessel though the results of the measurement of intrinsic viscosity, weight average molecular weight, branching parameter G, weight average molecular weight and weight average number of branching calculated using the fractioned sample, number of branching $\lambda$, melt viscosity and melt tension were similar to those of the Examples 1 to 8 without involving pre-condensation.

EXAMPLE 13

Bisphenol A (2,200 g, 9.7 mol) and 1,1,1-tris(4-hydroxyphenyl)ethane (20.1 g, 0.069 mol), 2.0 N aqueous sodium hydroxide (13.6 L) and methylene chloride (8 L) were charged and stirred in a 50 L vessel with a stirrer, phosgene was blown therein for 70 minutes, then an aqueous phase and an organic phase were separated. A solution of polycarbonate oligomer in methylene chloride (concentration, 320 g/L) was obtained in this way. The chloroformate concentration in this solution was 0.7 eq/L.

Thus obtained solution of polycarbonate oligomer in methylene chloride (8 L), bisphenol A (573 g, 2.5 mol), 7.25 wt % aqueous sodium hydroxide solution (4,000 g), triethylamine (4.4 g, 0.043 mol), p-tert-butylphenol (70.4 g, 0.47 mol) and methylene chloride (6 L) were added to a homogenizer and polycondensation was carried out for 10 minutes while stirring in such a way that the interfacial area of the emulsion was 90 m$^2$/L to 100 m$^2$/L.

Subsequently, the aqueous sodium hydroxide solution (concentration, 48% by weight; 238 ml) was added and the polycondensation was carried out at room temperature for 60 minutes while stirring in such a way that the interfacial area of the emulsion was 20 m$^2$/L to 30 m$^2$/L.

The resulting reaction mixture was separated into an aqueous phase and methylene chloride phase containing the product polymer, and said methylene chloride phase was washed with water, acid (0.1 N hydrochloric acid) and water in this order. Methylene chloride was removed from this organic phase at 40° C. under reduced pressure to give polycarbonate as white powder. The results are shown in Tables 3 and 4.

EXAMPLE 14

The same operation as in Example 13 was carried out with the exception that p-cumylphenol (99.5 g) was used in place of p-tert-butylphenol (70.4 g).

EXAMPLE 15

The same operation as in Example 13 was carried out with the exception that p-tert-octylphenol (96.7 g) was used in place of p-tert-butylphenol (70.4 g).

EXAMPLE 16

The same operation as in Example 13 was carried out with the exception that p-cumylphenol (116.4 g) was used in place of p-tert-butylphenol (70.4 g).

EXAMPLE 17

The same operation as in Example 13 was carried out with the exception that p-cumylphenol (82.3 g) was used in place of p-tert-butylphenol (70.4 g).

EXAMPLE 18

Bisphenol A (2,200 g, 9.7 mol), 2.0 N aqueous sodium hydroxide solution (13.6 L) and methylene chloride (8 L) were charged and stirred in a 50 L vessel with a stirrer, phosgene was blown therein for 70 minutes, then an aqueous phase and an organic phase were separated. Thus, a solution of polycarbonate oligomer in methylene chloride (concentration, 320 g/L) was obtained. The chloroformate concentration in this solution was 0.7 mol/L.

Thus obtained solution of polycarbonate oligomer in methylene chloride (8 L), 1,1,1-tris(4-hydroxyphenyl)ethane (21.1 g, 0.069 mol) as a branching agent, 0.5 wt % aqueous sodium hydroxide solution (2,200 g) and triethylamine (4.4 g, 0.043 mol), were added to a homogenizer and polycondensation was carried out for 60 minutes while stirring in such a way that the interfacial area of the emulsion was 90 m$^2$/L to 100 m$^2$/L.

After the reaction was over, bisphenol A (573 g, 2.5 mol), 7.25 wt % aqueous sodium hydroxide solution (4,000 g), p-tert-butylphenol (70.4 g, 0.47 mol) and methylene chloride (6 L) were added thereto, and reacted for 10 minutes while stirring in such a way that the interfacial area of the emulsion was 90 m$^2$/L to 100 m$^2$/L. Then, an aqueous sodium hydroxide solution (concentration: 48% by weight, 238 ml) was added and polycondensation was carried out at room temperature while stirring in such a way that the interfacial area of the emulsion was 20 m$^2$/L to 30 m$^2$/L.

The resulting reaction mixture was separated into an aqueous phase and a methylene chloride phase containing the product polymer, and said methylene chloride phase was washed with water, acid (0.1 N hydrochloric acid) and water in this order. Methylene chloride was removed from this organic phase at 40° C. under reduced pressure to give a polycarbonate as white powder. The results are shown in Tables 5 and 6.

TABLE 3

| No. | Intrinsic Viscosity [$\eta$] | Weight Average Molecular Weight $M_w$ | Branching Parameter G | By Fractional Precipitation | | Degree of Branching $10^4 \lambda$ | Melt[1] Viscosity (poise) | Melt[2] Tension (g) |
|---|---|---|---|---|---|---|---|---|
| | | | | Weight Average Number of Branching $n_w$ | Weight Average Molecular Weight $M_w$ | | | |
| Example 13 | 0.51 | 68,100 | 0.50 | 6.2 | 65,200 | 0.951 | 16,300 | 13.1 |
| Example 14 | 0.51 | 64,900 | 0.52 | 5.8 | 62,800 | 0.923 | 15,700 | 12.5 |
| Example 15 | 0.50 | 66,500 | 0.50 | 5.5 | 60,300 | 0.912 | 16,000 | 12.9 |
| Example 16 | 0.41 | 40,200 | 0.62 | 5.5 | 39,000 | 1.410 | 9,600 | 4.8 |
| Example 17 | 0.59 | 83,400 | 0.49 | 5.8 | 82,500 | 0.703 | 20,300 | 16.2 |

TABLE 4

| No. | Acetone*1 Soluble Matter (wt %) | Izod Impact Strength*2 | | | | YI*3 |
|---|---|---|---|---|---|---|
| | | −10° C. | −15° C. | −20° C. | −25° C. | |
| Example 13 | 2.0 | 10 | 9 | 4 | 2 | 1.9 |
| Example 14 | 2.4 | 10 | 10 | 9 | 5 | 1.8 |
| Example 15 | 2.4 | 10 | 10 | 8 | 4 | 1.7 |
| Example 16 | 2.6 | 10 | 10 | 8 | 3 | 1.6 |
| Example 17 | 1.9 | 10 | 10 | 10 | 7 | 1.8 |

TABLE 5

| No. | Intrinsic Viscosity [$\eta$] | Weight Average Molecular Weight $M_w$ | Branching Parameter G | By Fractional Precipitation | |
|---|---|---|---|---|---|
| | | | | Weight Average Number of Branching $n_w$ | Weight Average Molecular Weight $M_w$ |
| Example 18 | 0.50 | 68,500 | 0.49 | 6.5 | 66,900 |

| No. | Degree of Branching $10^4 \lambda$ | Melt[1] Viscosity (poise) | Melt[2] Tension (g) | Taking-off Parameter A | Thickness of Sidewall (mm) | Thickness of Convex (mm) |
|---|---|---|---|---|---|---|
| Example 18 | 0.972 | 15,900 | 13.9 | 6.5 | 2.02 | 1.96 |

TABLE 6

| No. | Acetone*1 Soluble Matter (wt %) | Izod Impact Strength*2 | | | | YI*3 |
|---|---|---|---|---|---|---|
| | | −10° C. | −15° C. | −20° C. | −25° C. | |
| Example 18 | 1.9 | 10 | 10 | 6 | 2 | 1.7 |

*1Acetone-soluble matter
This is a component extracted in Soxhlet using acetone as a solvent. That is, 15 g of a material obtained by grinding a smaple of the polycarbonate and passing through 100 mesh metal net was placed on a cylindrical filter paper No. 84 (28 × 100 mm) and extracted with 300 ml of acetone by refluxing for 8 hours at reflux amount of once (20 ml/once) per 3 to 4 minutes. Then, a residue after evaporation of 300 ml of acetone was measured and was referred to as the acetone-soluble matter.
*2Izod impact strength
Measured according to JIS-K-7110. That is, an Izod impact test of 10 samples was conducted and the number of samples undergone ductile fracture was indicated. The others underwent brittle fracture. The samples were notched and had a thickness of 3 mm. Measurement was conducted under a weight of 2.75 J.
*3YI (Yellowness Index)
A plate of 3 mm thick was measured according to JIS-K-7105.

*1Acetone-soluble matter
This is a component extracted in Soxhlet using acetone as a solvent. That is, 15 g of a material obtained by grinding a sample of the polycarbonate and passing through 100 mesh metal net was placed on a cylindrical filter paper No. 84 (28×100 mm) and extracted with 300 ml of acetone by refluxing for 8 hours at reflux amount of once (20 ml/once) per 3 to 4 minutes. Then, a residue after evaporation of 300 ml of acetone was measured and was referred to as the acetone-soluble matter.
*2Izod impact strength
Measured according to JIS-K-7110. That is, an Izod impact test of 10 samples was conducted and the number of samples undergone ductile fracture was indicated. The others underwent brittle fracture. The samples were notched and had a thickness of 3 mm. Measurement was conducted under a weight of 2.75 J.
*3YI (Yellowness Index)
A plate of 3 mm thick was measured according to JIS-K-7105.

What is claimed is:

1. A branched polycarbonate having
   (1) an intrinsic viscosity ($\eta$) of 0.3 to 2 dl/g in methylene chloride at 20° C.;
   (2) a branching parameter, $G = (\eta)/(\eta)_{lin}$, wherein $(\eta)_{in}$ is an intrinsic viscosity of a straight-chain polycarbonate having the same weight average molecular weight as in the branched polycarbonate according to the light scattering method of 0.05 to 0.9; and
   (3) a degree of branching, $\lambda = n_w/M_w$, wherein $n_w$ is weight average number of branching and $M_w$ is weight average molecular weight, of $0.2 \times 10^{-4}$ to $2 \times 10^{-4}$.

2. The branched polycarbonate according to claim 1 which has a branched nucleus structure derived from a branching agent represented by the formula:

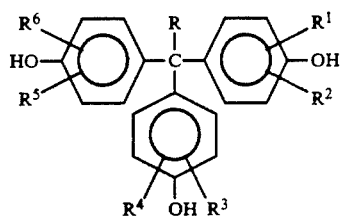

wherein R is a hydrogen atom or an alkyl group having 1 to 5 carbon atoms, $R^1$ to $R^6$ are hydrogen atoms, alkyl groups having 1 to 5 carbon atoms or halogen atoms, respectively.

3. The branched polycarbonate according to claim 2 which has a branched nucleus structure derived from 1,1,1-tris(4-hydroxyphenyl)ethane.

4. The branched polycarbonate according to claim 2 having an acetone-soluble matter is not more than 3.5% by weight.

5. The branched polycarbonate according to claim 1, wherein the intrinsic viscosity is 0.35 to 1 dl/g; the branching parameter is 0.2 to 0.8; the degree of branching is 0.4 to $10^{-4}$ to $1.9 \times 10^{-4}$; and the branched polycarbonate has a weight average molecular weight of 20,000 to 150,000.

6. The branched polycarbonate according to claim 5, wherein the branching agent is selected from the group consisting of
1,1,1-tris(4-hydroxyphenyl)methane;
1,1,1-tris(4-hydroxyphenyl)ethane;
1,1,1-tris(4-hydroxyphenyl)propane;
1,1,1-tris(2methyl-4-hydroxyphenyl)methane;
1,1,1-tris(2methyl-4-hydroxyphenyl)ethane;
1,1,1-tris(3methyl-4-hydroxyphenyl)methane;
1,1,1-tris(3methyl-4-hydroxyphenyl)ethane;
1,1,1-tris(3,5-dimethyl-4-hydroxyphenyl)methane;
1,1,1-tris(3,5-dimethyl-4-hydroxyphenyl)ethane;
1,1,1-tris(3-chloro-4-hydroxyphenyl)methane;
1,1,1-tris(3-chloro-4-hydroxyphenyl)ethane;
1,1,1-tris(3,5-chloro-4-hydroxyphenyl)methane;
1,1,1-tris(3,5-chloro-4-hydroxyphenyl)ethane;
1,1,1-tris(3-bromo-4-hydroxyphenyl)methane;
1,1,1-tris(3-bromo-4-hydroxyphenyl)ethane;
1,1,1-tris(3,5-dibromo-4-hydroxyphenyl)methane; and
1,1,1-tris(3,5-dibromo-4-hydroxyphenyl)ethane.

7. The branched polycarbonate according to claim 4, wherein the branched polycarbonate has a viscosity average molecular weight of 15,000 to 40,000.

8. A branched polycarbonate having
(1) an intrinsic viscosity ($\eta$) of 0.3 to 2 dl/g in methylene chloride at 20° C.;
(2) a branching parameter, $G = (\eta)/(\eta)_{lin}$, wherein ($\eta)_{lin}$ is an intrinsic viscosity of a straight-chain polycarbonate having the same weight average molecular weight as in the branched polycarbonate according to the light scattering method of 0.05 to 0.9;
(3) a degree of branching, $\lambda = n_w/M_w$, wherein $n_w$ is weight average number of branching and $M_w$ is weight average molecular weight, of $0.2 \times 10^{-4}$ to $2 \times 10^{-4}$; and
(4) a taking-off parameter, $A = Z_{30}/Z_3$, wherein $Z_{30}$ and $Z_3$ are elongational viscosities at the temperature of 200° C. and a constant strain rate of 0.1 $\sec^{-1}$ at 30 and 3 seconds, respectively, of 2.5 to 20.

9. The branched polycarbonate according to claim 8 which has a branched nucleus structure derived from a branching agent represented by the formula:

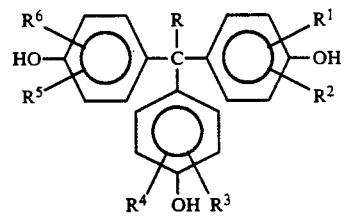

wherein R is a hydrogen atom or an alkyl group having 1 to 5 carbon atoms and $R^1$ to $R^6$ are hydrogen atoms, alkyl groups having 1 to 5 carbon atoms or halogen atoms.

10. The branched polycarbonate according to claim 9 which has a branched nucleus structure derived from 1,1,1-tris(4-hydroxyphenyl)ethane.

11. The branched polycarbonate according to claim 9 having an acetone-soluble matter is not more than 3.5% by weight.

12. The branched polycarbonate according to claim 8, wherein the intrinsic viscosity is 0.35 to 1 dl/g; the branching parameter is 0.2 to 0.8; the degree of branching is 0.4 to $10^{-4}$ to $1.9 \times 10^{-4}$; the taking off parameter is 3 to 10 and the branched polycarbonate has a weight average molecular weight of 20,000 to 150,000.

13. The branched polycarbonate according to claim 11, wherein the branched polycarbonate has a viscosity average molecular weight of above 15,000 to 40,000.

* * * * *